US012057660B2

(12) United States Patent
Xu et al.

(10) Patent No.: US 12,057,660 B2
(45) Date of Patent: Aug. 6, 2024

(54) ELECTRICAL CONNECTOR AND CONNECTOR ASSEMBLY

(71) Applicants: Tyco Electronics (Shanghai) Co. Ltd, Shanghai (CN); TE Connectivity Services GmbH, Schaffhausen (CH)

(72) Inventors: Fengping (Alex) Xu, Shanghai (CN); Wei (Zach) Peng, Middletown, PA (US)

(73) Assignees: TE Connectivity Solutions GmbH, Schaffhausen (CH); Tyco Electronics (Shanghai) Co., Ltd., Shanghai (CN)

(*) Notice: Subject to any disclaimer, the term of this patent is extended or adjusted under 35 U.S.C. 154(b) by 100 days.

(21) Appl. No.: 17/574,259

(22) Filed: Jan. 12, 2022

(65) Prior Publication Data

US 2022/0224054 A1 Jul. 14, 2022

(30) Foreign Application Priority Data

Jan. 13, 2021 (CN) ......................... 202110045478.6

(51) Int. Cl.

| | |
|---|---|
| ***H01R 13/6471*** | (2011.01) |
| ***H01R 12/71*** | (2011.01) |
| ***H01R 13/24*** | (2006.01) |
| ***H01R 13/516*** | (2006.01) |
| ***H01R 13/629*** | (2006.01) |

(52) U.S. Cl.

CPC ....... *H01R 13/6471* (2013.01); *H01R 12/712* (2013.01); *H01R 13/24* (2013.01); *H01R 13/516* (2013.01); *H01R 13/629* (2013.01)

(58) Field of Classification Search

CPC ........................... H01R 13/24; H01R 13/6471; H01R 13/6599; H01R 13/6597; H01R 13/6588; H01R 12/712; H01R 12/714; H01R 12/716; H01R 12/735; H01R 12/732; H05K 3/368

USPC ............................... 439/931, 607.12, 607.05

See application file for complete search history.

(56) References Cited

U.S. PATENT DOCUMENTS 6,579,124 B1 * 6/2003 Vanbesien ............ H01R 12/727 439/607.05
6,776,629 B2 * 8/2004 Shuey ................ H01R 13/6471 439/108
7,322,855 B2 * 1/2008 Mongold ........... H01R 13/6587 439/607.05
8,002,581 B1 * 8/2011 Whiteman, Jr. ... H01R 13/6589 439/607.18

(Continued)

*Primary Examiner* — Marcus E Harcum
(74) *Attorney, Agent, or Firm* — Barley Snyder

(57) ABSTRACT

An electrical connector comprises an insulation housing, a plurality of grounding terminal columns and a plurality of hybrid terminal columns. The plurality of grounding terminal columns are arranged on the insulation housing and comprises a plurality of first grounding terminals. The plurality of hybrid terminal columns are arranged on the insulation housing adjacent respective ones of the plurality of grounding terminal columns and includes a plurality of second grounding terminals and a plurality of differential signal terminal pairs. Each of the differential signal terminal pairs is located between two adjacent second grounding terminals in one hybrid terminal column and is adjacent to two first grounding terminals of the grounding terminal columns adjacent to the one hybrid terminal column at both sides thereof.

20 Claims, 16 Drawing Sheets

(56) References Cited

U.S. PATENT DOCUMENTS

| | | | | |
|---|---|---|---|---|
| 8,083,526 | B2 * | 12/2011 | Long | H01R 12/721<br>439/60 |
| 8,525,635 | B2 * | 9/2013 | Navarro | H01C 1/142<br>338/22 R |
| 8,535,065 | B2 * | 9/2013 | Costello | H01R 31/06<br>439/82 |
| 8,888,531 | B2 * | 11/2014 | Jeon | H01R 13/658<br>439/607.07 |
| 9,106,020 | B2 * | 8/2015 | Cohen | H01R 12/00 |
| 9,356,401 | B1 * | 5/2016 | Horning | H01R 13/6587 |
| 9,373,917 | B2 * | 6/2016 | Sypolt | H01R 13/6585 |
| 9,472,887 | B1 * | 10/2016 | Horning | H01R 13/6471 |
| 9,666,961 | B2 * | 5/2017 | Horning | H01R 13/6599 |
| 9,666,998 | B1 * | 5/2017 | de Boer | H01R 13/6596 |
| 9,923,309 | B1 * | 3/2018 | Aizawa | H05K 1/113 |
| 10,135,199 | B1 * | 11/2018 | Ju | H01R 12/7082 |
| 10,283,913 | B2 * | 5/2019 | Takeuchi | H01R 13/6471 |
| 10,522,948 | B2 * | 12/2019 | Cho | H01R 13/6471 |
| 10,522,949 | B1 * | 12/2019 | Loffink | H01R 13/6471 |
| 10,790,618 | B2 * | 9/2020 | Munoz | H01R 12/73 |
| 11,108,194 | B2 * | 8/2021 | Lin | H01R 13/6471 |
| 11,444,398 | B2 * | 9/2022 | Stokoe | H01R 12/716 |
| 11,569,618 | B2 * | 1/2023 | Ito | H01R 13/6594 |
| 2007/0021000 | A1 * | 1/2007 | Laurx | H01R 13/518<br>439/607.05 |
| 2013/0102192 | A1 * | 4/2013 | Davis | H01R 13/6581<br>439/607.07 |
| 2018/0261960 | A1 * | 9/2018 | Miyamura | H01R 13/6581 |
| 2018/0375262 | A1 * | 12/2018 | Ju | H01R 12/57 |
| 2019/0020155 | A1 * | 1/2019 | Trout | H01R 13/6587 |
| 2019/0131746 | A1 * | 5/2019 | Morgan | H01R 13/6584 |
| 2021/0066862 | A1 * | 3/2021 | Chen | H01R 13/6586 |
| 2021/0075143 | A1 * | 3/2021 | Laurx | H01R 13/6471 |
| 2021/0098939 | A1 * | 4/2021 | Wu | H01R 12/727 |
| 2021/0234315 | A1 * | 7/2021 | Ellison | H01R 13/6477 |
| 2022/0052490 | A1 * | 2/2022 | Cheng | H01R 12/7082 |
| 2022/0094116 | A1 * | 3/2022 | Lin | H01R 13/6597 |
| 2022/0102902 | A1 * | 3/2022 | Lin | H01R 13/6471 |

* cited by examiner

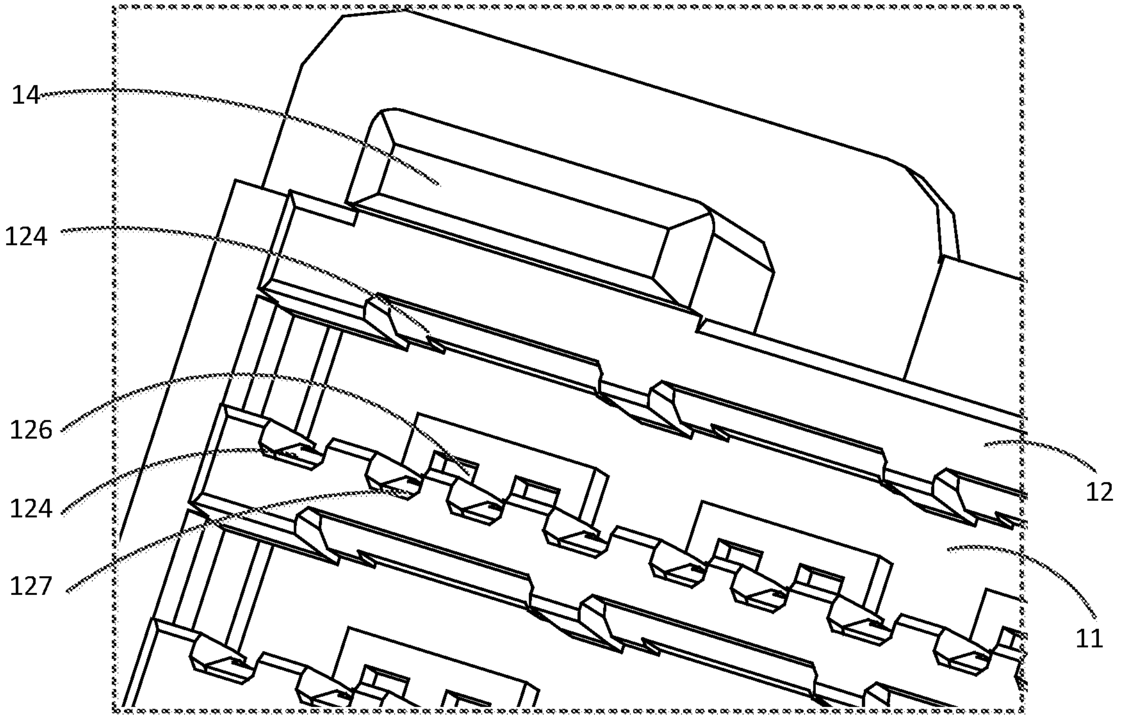
FI
G. 15
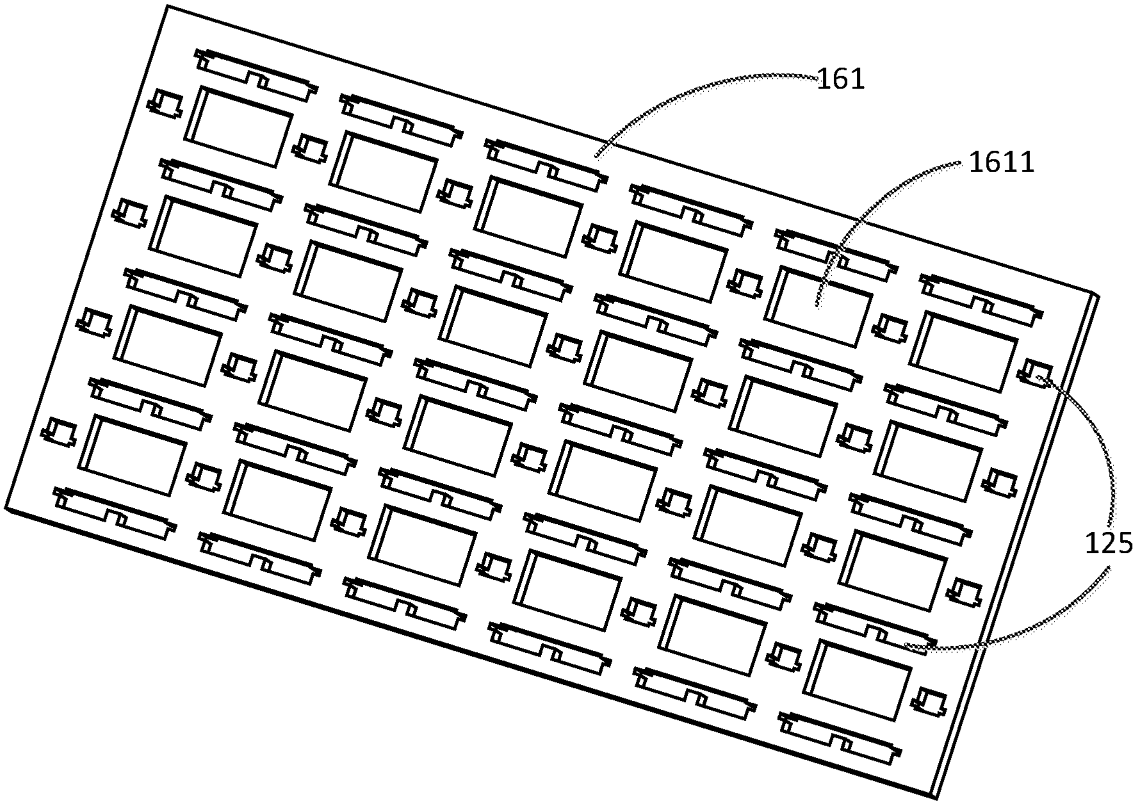
FIG. 16

ELECTRICAL CONNECTOR AND CONNECTOR ASSEMBLY

CROSS-REFERENCE TO RELATED APPLICATIONS

This application claims the benefit of Chinese Patent Application No. 202110045478.6 filed on Jan. 13, 2021 in the China National Intellectual Property Administration, the whole disclosure of which is incorporated herein by reference.

FIELD OF THE INVENTION

The present disclosure relates to an electrical connector, and in particular, to an electrical connector adapted for high-speed signal transmission, and a connector assembly comprising the same.

BACKGROUND

With development of digital information technology, data transmission rates have greatly increased in recent years. For example, in communications field, a high-speed connector is required to achieve at least 112 Gbps high-speed signal transmission. Since data transmission often requires an electrical connector to connect different interfaces, a signal transmission speed and quality of the electrical connector will greatly affect the speed and stability of data transmission. For example, the electrical connector may be used to realize an electrical connection between two printed circuit boards (PCBs).

Generally, electrical connectors suitable for high-speed signal transmission mainly include a base made of insulation material and a plurality of terminal columns mounted on the base. Grounding terminals and differential signal terminal pairs in each of the terminal columns are alternately arranged, wherein the grounding terminals of the adjacent terminal columns correspond to positions at which the differential signal terminal pairs are located to form an independent ground shield for each of the differential signal terminal pairs. In this type of electrical connector, in order to take into account both the high-speed performance and high-density requirements, some of the differential signal terminal pairs are arranged in a staggered manner with the grounding terminals. However, this arrangement does not entirely eliminate crosstalk between the differential signal terminal pairs of one column and the differential signal terminal pairs of the adjacent columns. In order to further reduce this crosstalk, a spacing between the columns may be increased. However, this reduces the density of the transmission channel.

SUMMARY

According to an embodiment of the present disclosure, an electrical connector includes an insulation housing, a plurality of grounding terminal columns and a plurality of hybrid terminal columns. The plurality of grounding terminal columns are arranged on the insulation housing and comprises a plurality of first grounding terminals. The plurality of hybrid terminal columns are arranged on the insulation housing adjacent respective ones of the plurality of grounding terminal columns and comprises a plurality of second grounding terminals and a plurality of differential signal terminal pairs. Each of the differential signal terminal pairs is located between two adjacent second grounding terminals in one hybrid terminal column and is adjacent to two first grounding terminals of the grounding terminal columns adjacent to the one hybrid terminal column at both sides thereof.

BRIEF DESCRIPTION OF THE DRAWINGS

The invention will now be described by way of example with reference to the accompanying Figures, of which:

FIG. 15 shows a schematic enlarged view of a part 'C' shown in FIG. 14;

FIG. 16 shows a schematic perspective view of a metallization layer according to an exemplary embodiment of the disclosure, wherein the insulation housing is not shown.

DETAILED DESCRIPTION OF THE EMBODIMENTS

Figure 1:
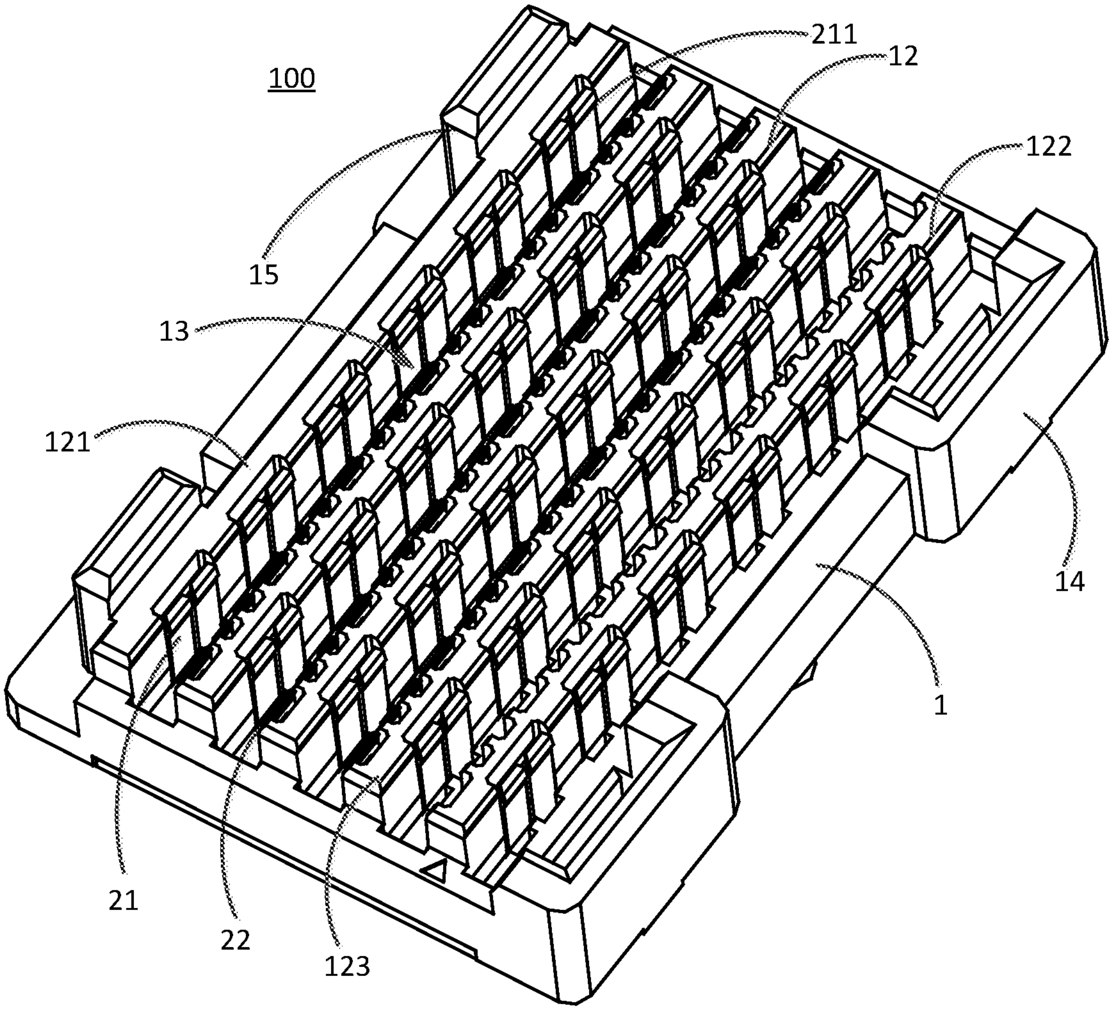
FIG. 1 shows a schematic perspective view of an electrical connector according to an exemplary embodiment of the disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure an electrical connector includes an insulation housing, a plurality of grounding terminal columns arranged on the insulation housing and including a plurality of first grounding terminals, and a plurality of hybrid terminal columns arranged on the insulation housing and including a plurality of second grounding terminals and a plurality of differential signal terminal pairs. The plurality of grounding terminal columns and the plurality of hybrid terminal columns are arranged adjacent to each other, respectively. Each of the differential signal terminal pairs is located between two adjacent second grounding terminals in one hybrid terminal column and is adjacent to two first grounding terminals of the grounding terminal columns adjacent to the one hybrid terminal column at both sides thereof.

According to another embodiment of the disclosure, there is provided a connector assembly including two electrical connectors as described above. The grounding terminals and the differential signal terminal pairs of the two electrical connectors are electrically connected with each other.

Figure 2:
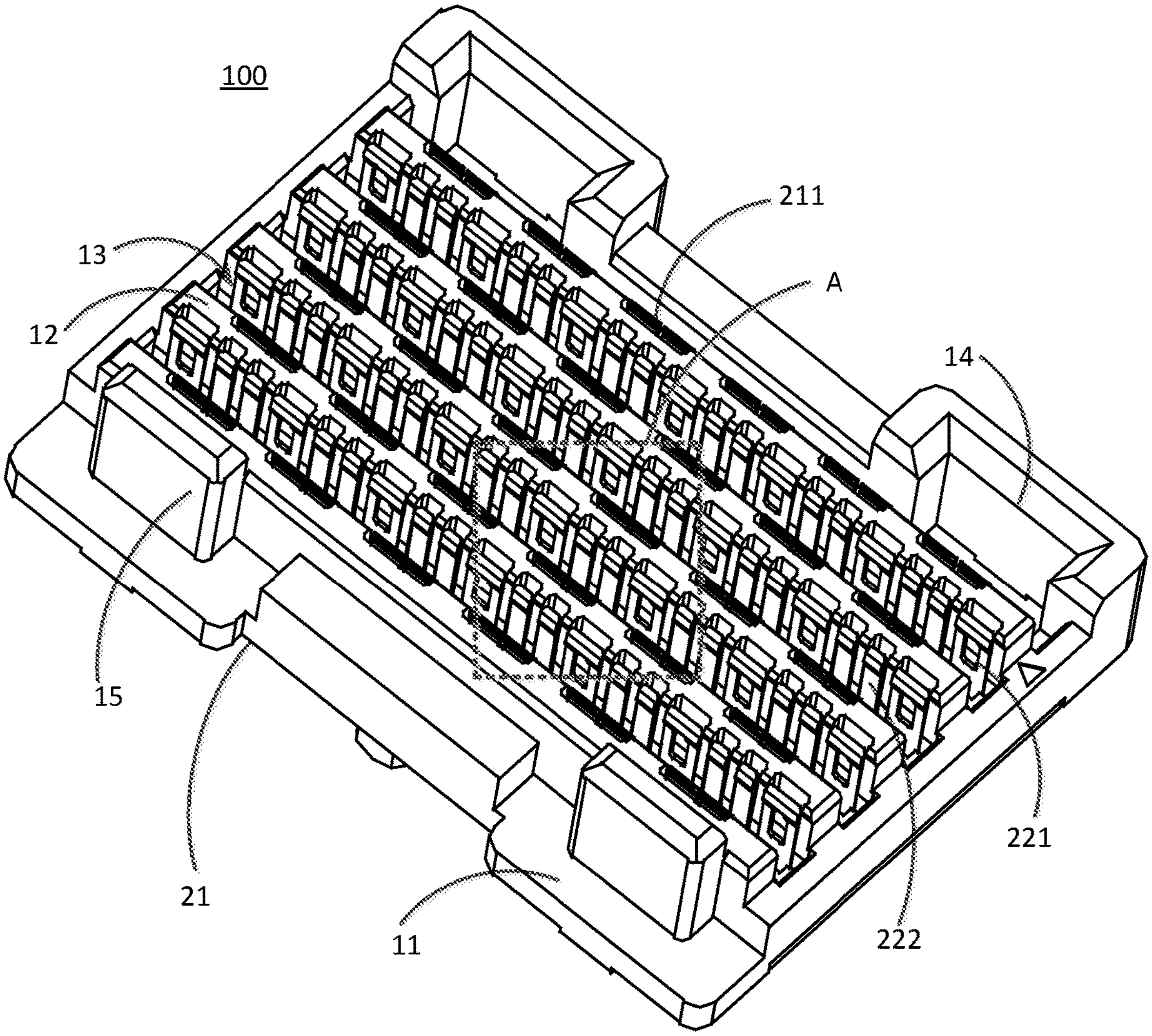
FIG. 2 shows another schematic perspective view of the electrical connector shown in FIG. 1.
Figure 3:
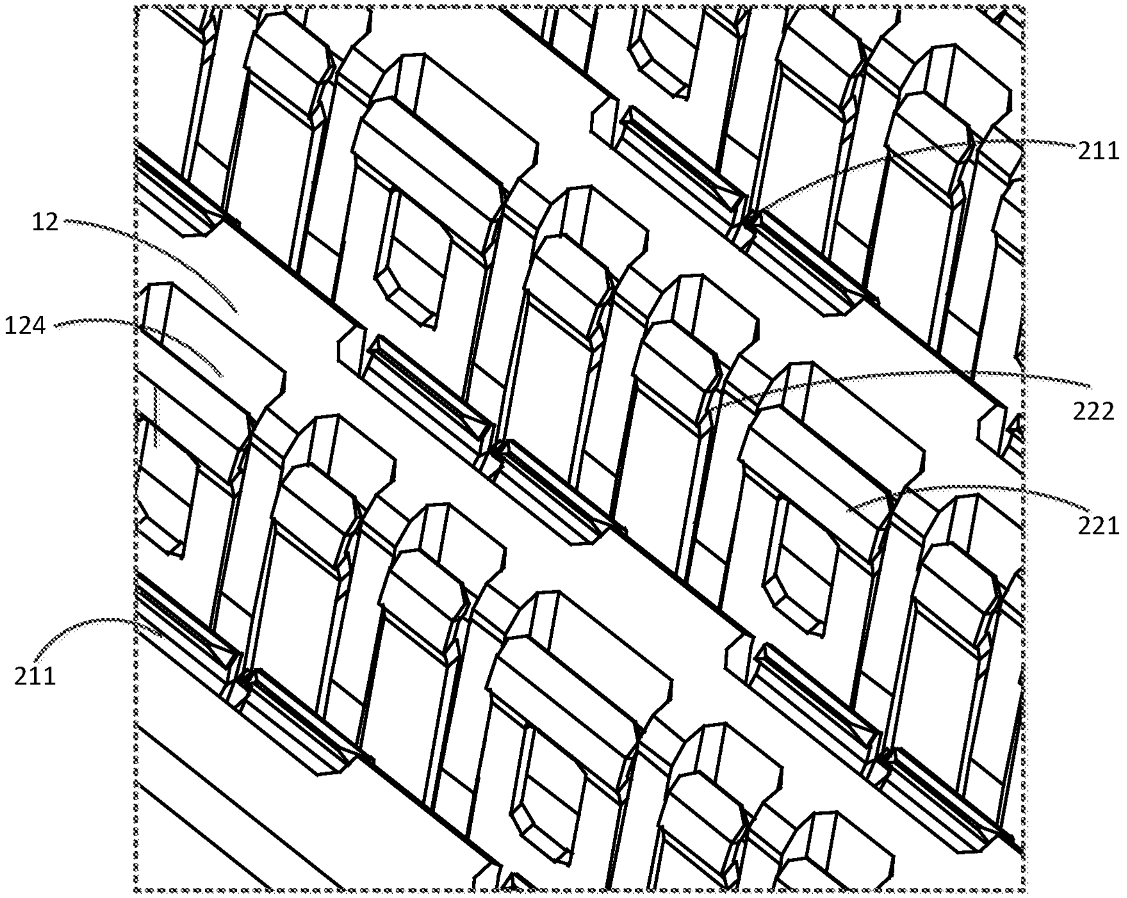
FIG. 3 shows a schematic enlarged view of a part 'A' shown in FIG. 2.
Figure 4:
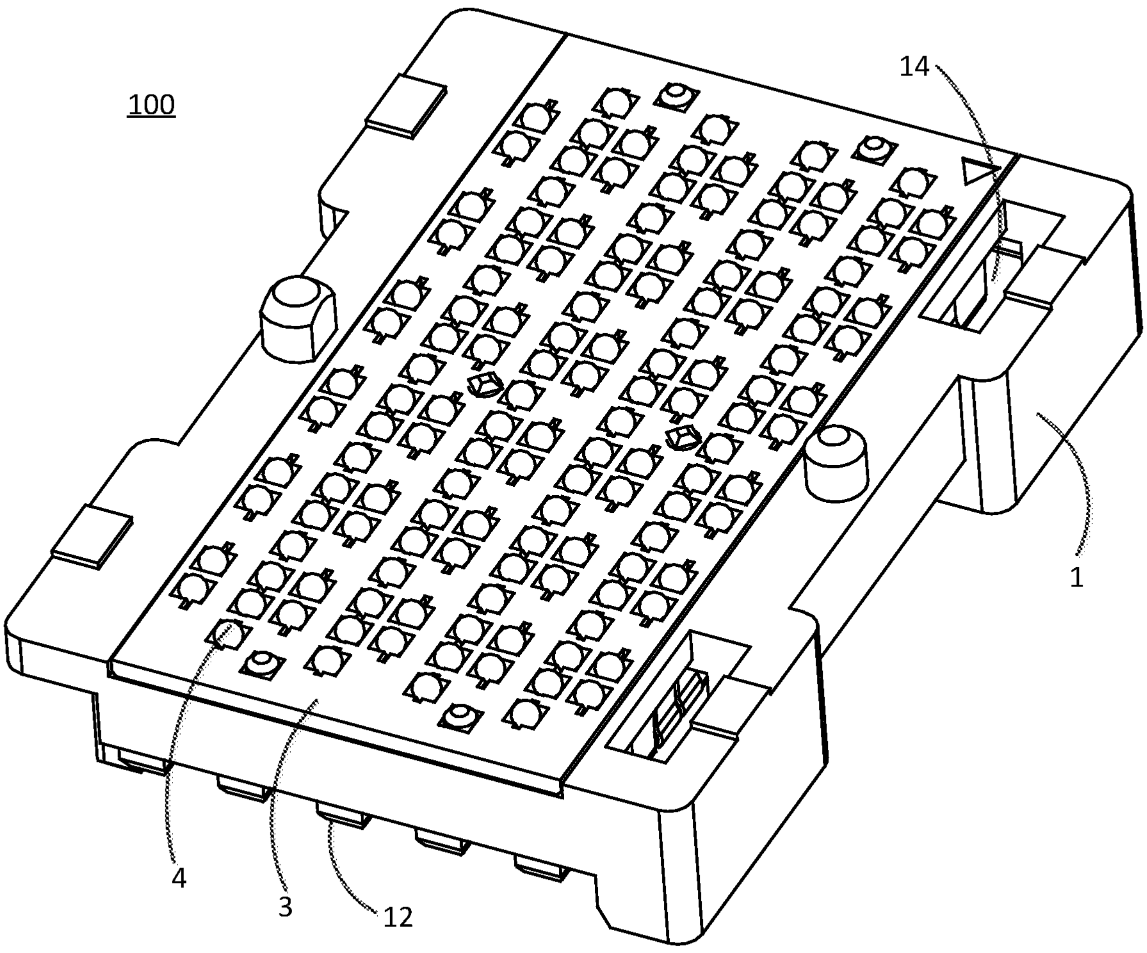
FIG. 4 shows a further another schematic perspective view of the electrical connector shown in FIG. 1.
Figure 5:
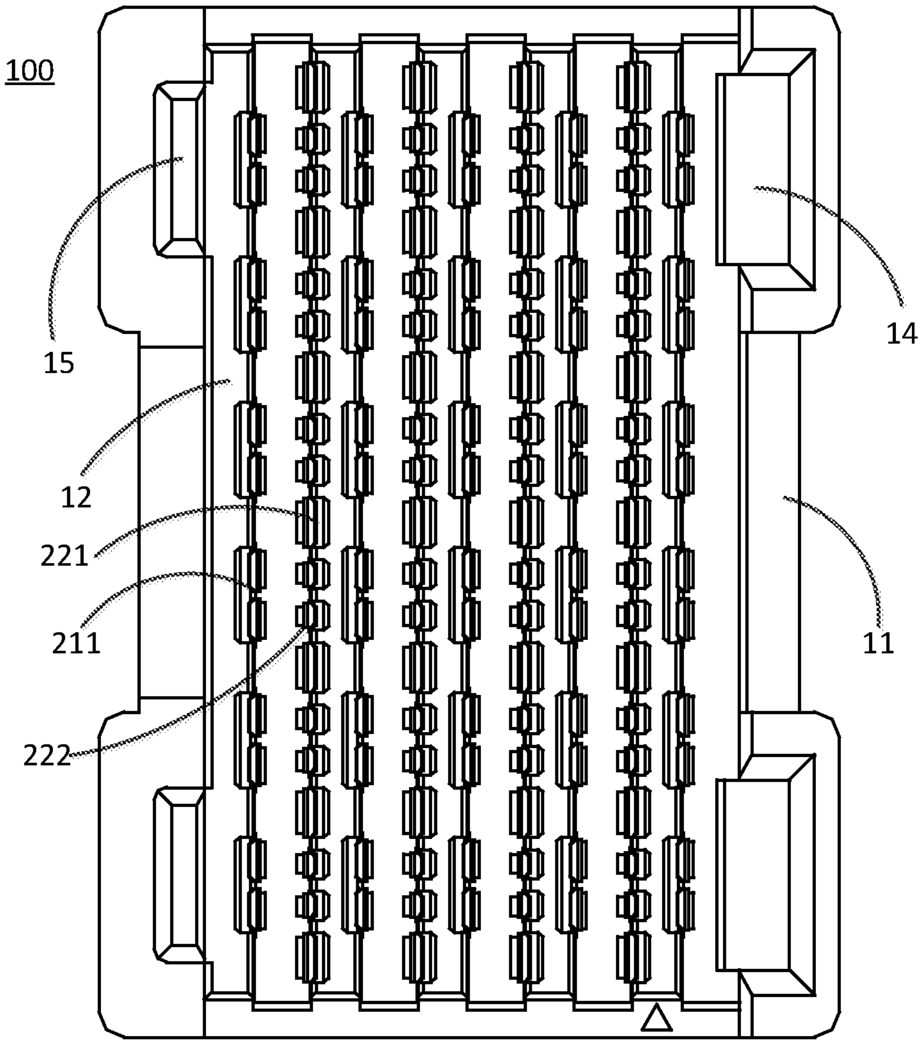
FIG. 5 shows a top view of the electrical connector shown in FIG. 1.

FIG. 1 shows a schematic perspective view of an electrical connector according to an exemplary embodiment of the disclosure, FIG. 2 shows another schematic perspective view of the electrical connector shown in FIG. 1, FIG. 3 shows a schematic enlarged view of a part 'A' shown in FIG. 2, FIG. 4 shows a further another schematic perspective view shown in FIG. 1, and FIG. 5 shows a top view of the electrical connector shown in FIG. 1.

According to an exemplary embodiment of the disclosure, as illustrated in FIGS. 1-5, an electrical connector 100 is utilized in a communication system to transmit signals at a high speed, for example, at a speed of no less than 112 Gbps. The electrical connector 100 includes an insulation housing 1, a plurality of grounding terminal columns 21 and a plurality of hybrid terminal columns 22. The plurality of grounding terminal columns are arranged on the insulation housing 1 and include a plurality of first grounding terminals 211 adapted to transmit ground signals. The plurality of hybrid terminal columns 22 are arranged on the insulation housing 1 and include a plurality of second grounding terminals 221 and a plurality of differential signal terminal pairs 222 adapted to transmit differential signals. The plurality of grounding terminal columns 21 and the plurality of hybrid terminal columns 22 are arranged adjacent to each other, respectively. Each of the differential signal terminal pairs includes two adjacent differential signal terminals. Each of the differential signal terminal pairs 222 is located between two adjacent second grounding terminals 221 in one hybrid terminal column 22 and is adjacent to two first grounding terminals 211 of the two grounding terminal columns adjacent to the one hybrid terminal column 22 at both sides thereof. In this way, each of the differential signal terminal pairs is adjacent to the grounding terminals in both a column direction and a row direction; that is, each of the differential signal terminal pairs is surrounded by the grounding terminals. In this way, a signal crosstalk between different differential signal terminal pairs can be suppressed. Further, it is also possible to allow the grounding terminals and the differential signal terminals to be arranged at a higher density while ensuring a high-speed signal transmission performance of the electrical connector.

Figure 7:
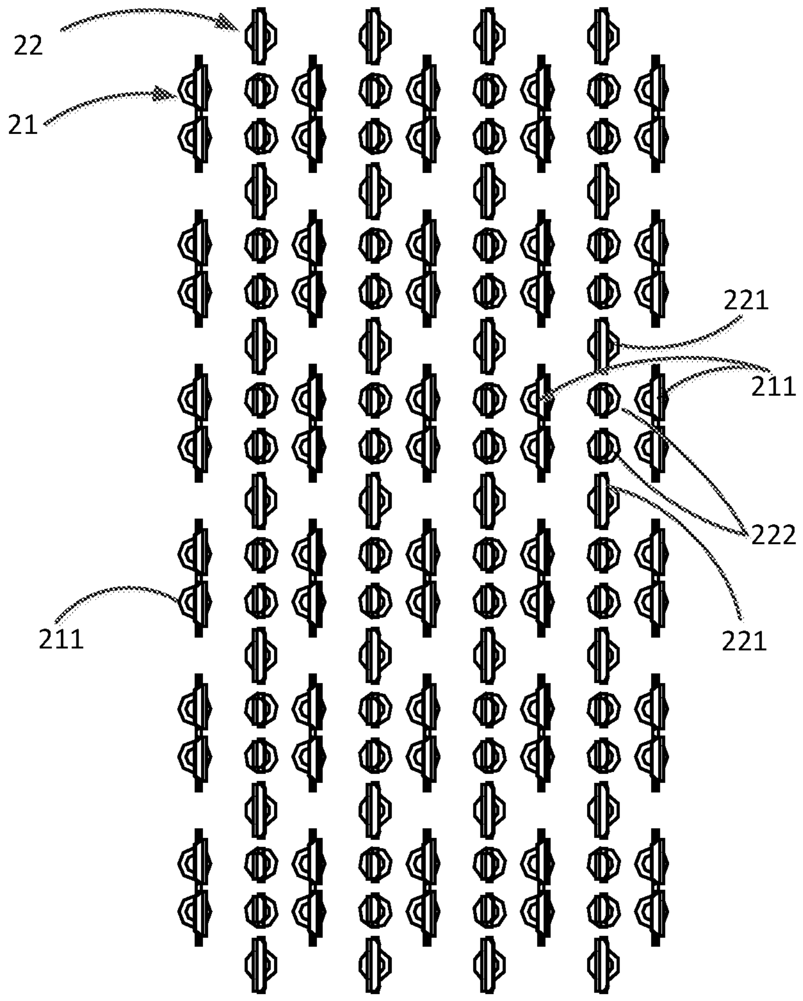
FIG. 7 shows a top view of an arrangement of terminals of an electrical connector according to an exemplary embodiment of the disclosure.
Figure 8:
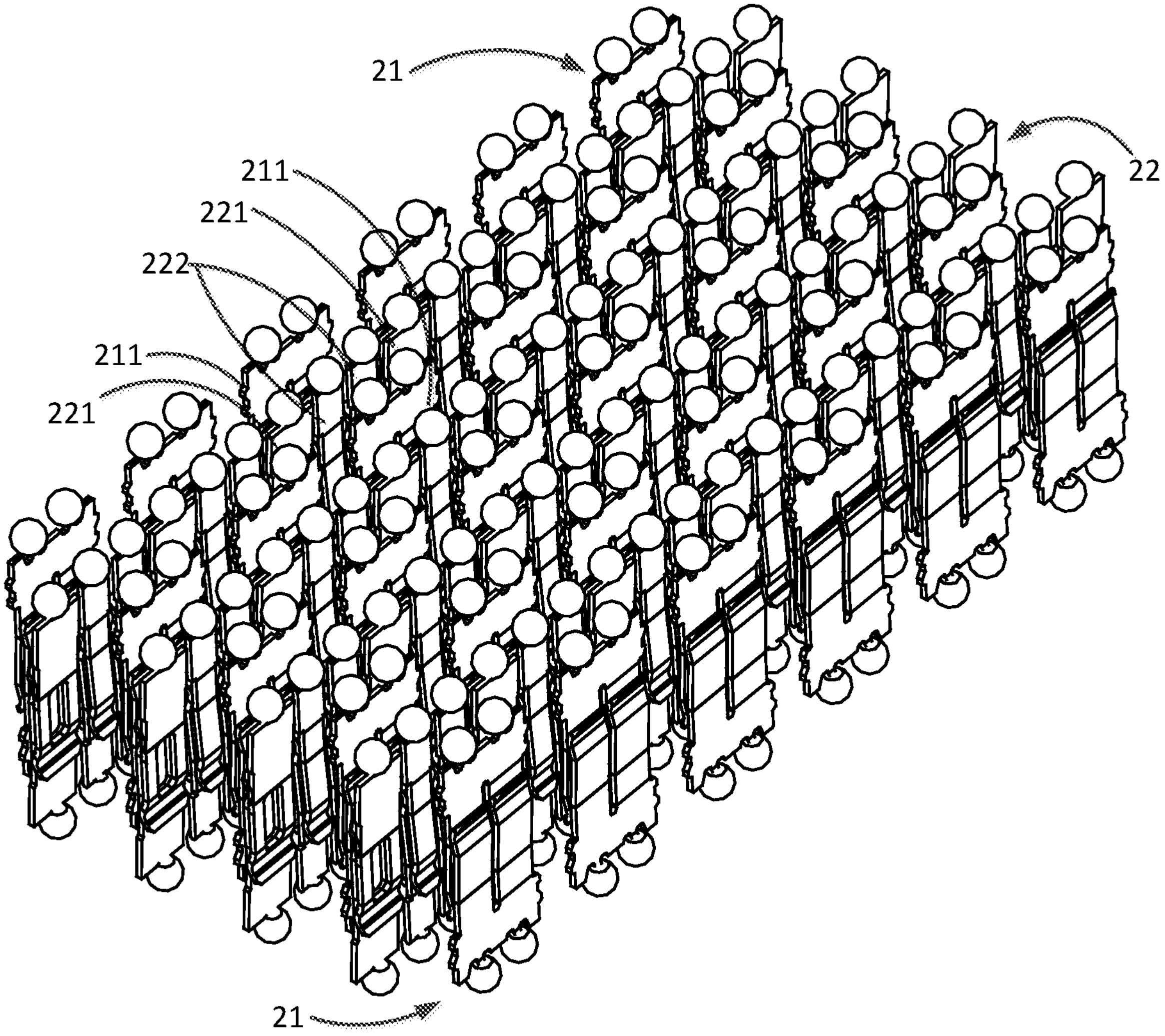
FIG. 8 shows a schematic perspective view of an arrangement of terminals of an electrical connector according to an exemplary embodiment of the disclosure.

FIG. 7 shows a top view of an arrangement of terminals of an electrical connector according to an exemplary embodiment of the disclosure, and FIG. 8 shows a schematic perspective view of an arrangement of terminals of an electrical connector according to an exemplary embodiment of the disclosure.

In an exemplary embodiment of the disclosure, as illustrated in FIGS. 1-5, 7 and 8, the grounding terminal columns 21 do not include the differential signal terminals. The plurality of hybrid terminal columns 22 include the plurality of second grounding terminals 221 and the plurality of differential signal terminal pairs 222, and each of the differential signal terminal pairs 222 is located between two second grounding terminals 221. With this arrangement, there are no two hybrid terminal columns directly adjacent to each other. Each of the differential signal terminal pairs 222 includes two differential signal terminals.

Figure 6:
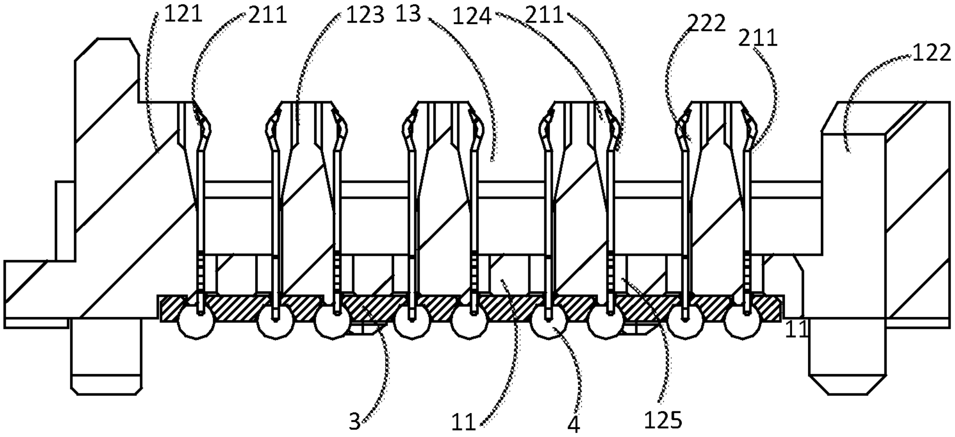
FIG. 6 shows a transverse cross-sectional view of the electrical connector shown in FIG. 1.

FIG. 6 shows a transverse cross-sectional view of the electrical connector shown in FIG. 1.

In an exemplary embodiment of the disclosure, referring to FIGS. 1-6, the insulation housing 1 includes a bottom wall 11 and a plurality of protruding bars 12. The grounding terminals and the differential signal terminal pairs 222 extend from a first side to a second side of the bottom wall 11 in a first direction (a height direction). The plurality of protruding bars 12 protrude from the second side of the bottom wall 11 and extend in a second direction (a length direction) perpendicular to the first direction. The grounding terminals and/or the differential signal terminals protruding from the second side of the bottom wall are held on side walls of the respective protruding bars 12.

The plurality of protruding bars 21 include a first outer protruding bar 121, a second outer protruding bar 122 and at least one middle protruding bar 123 located between the first outer protruding bar and the second outer protruding bar. One of the two adjacent terminal columns is the grounding terminal column 21, and the other is the hybrid terminal column 22. The first outer protruding bar 121 is provided with the grounding terminal column 21 on an inner side thereof. The second outer protruding bar 122 is provided with the grounding terminal column 21 and the hybrid terminal column 22 on an inner side and an outer side thereof, respectively. The at least one middle protruding bar 123 each is provided with the grounding terminal column 21 and the hybrid terminal columns 22 on both sides thereof, respectively. In this way, the grounding terminal column 21 is arranged on one of the two side walls, extending in the second direction, of each protruding bar expect for the first outer protruding bar, and the hybrid terminal column 22 is arranged on the other side of the two side walls. Further, there is no protruding bar provided with the grounding terminal column or the hybrid terminal columns on the both opposite sides thereof. In this way, the grounding terminals are located on the outermost side, and no signal terminal is located on the outermost side, thereby avoiding the crosstalk between the signal terminals and other external terminals.

In an exemplary embodiment of the disclosure, referring to FIGS. 1-6, an insertion slot 13 is formed between two adjacent protruding bars 12. The grounding terminal column 21 and the hybrid terminal column 22 are arranged on both sides of the insertion slot 13, respectively. In this way, the grounding terminal column 21 is arranged on one of two side walls of the insertion slot 13, and the hybrid terminal column 22 is arranged on the other of the two side walls. There is no such an insertion slot that is provided with the grounding terminal column or the hybrid terminal columns on the both opposite sides thereof.

Figure 17:
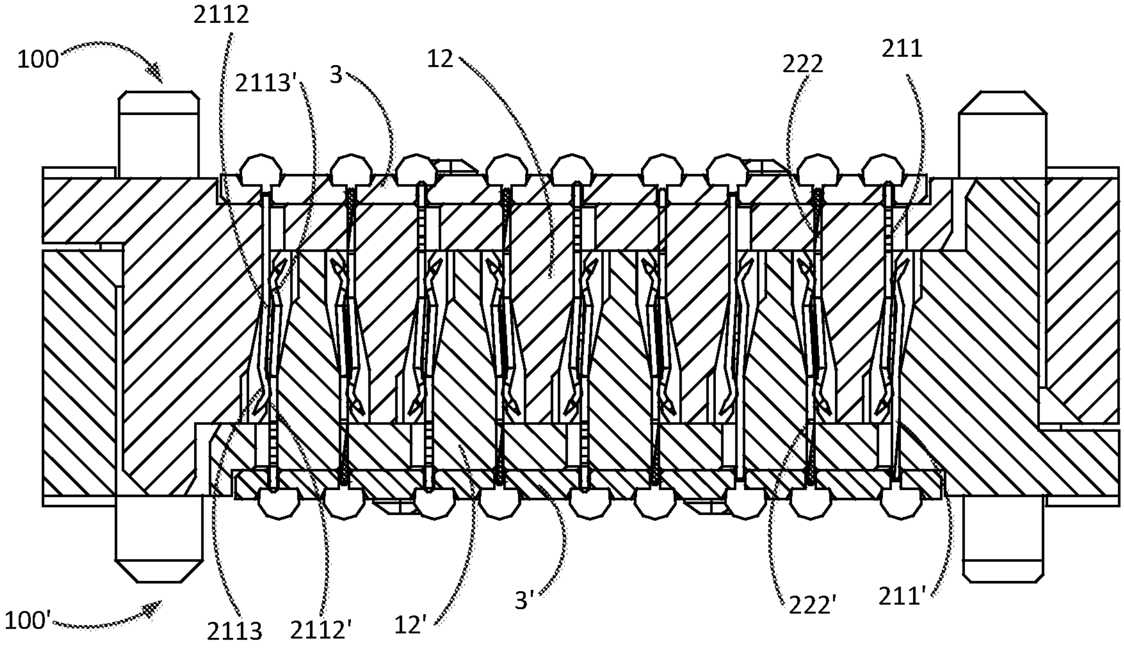
FIG. 17 shows a transverse cross-sectional view of a connector assembly according to an exemplary embodiment of the disclosure.

FIG. 17 shows a transverse cross-sectional view of a connector assembly according to an exemplary embodiment of the disclosure.

Referring to FIG. 17, according to an exemplary embodiment of another aspect of the disclosure, there is provided a connector assembly including two electrical connectors 100 and 100' according to any one of the embodiments as described above, wherein the grounding terminals and the differential signal terminal pairs of the two electrical connectors are electrically connected to each other to realize an electrical connection of the two electrical connectors with each other. That is, the first grounding terminals 211 of one electrical connector 100 are electrically connected with the first grounding terminals 211' of the other electrical connector 100', the second grounding terminals 221 of the one electrical connector 100 are electrically connected with the second grounding terminals 221' of the other connector 100', and the differential signal terminal pairs 222 of the one electrical connector 100 are electrically connected with the differential signal terminal pairs 222' of the other electrical connector 100'.

Further, the bottom wall 11, 11' of each of the electrical connectors is provided with a circuit board 3, 3 electrically connected to the grounding terminals and the differential signal terminals on the first side of the bottom wall, respectively, so that the electrical connection between the two circuit boards is realized. In this way, a signal transmission between the two circuit boards can be realized through the electrical connectors according to the embodiments of the disclosure.

In an exemplary embodiment of the disclosure, referring to FIGS. 6 and 17, the insertion slot 13 has a width approximately equal to or slightly greater than that of each of the protruding bars 12, so that the protruding bars 12 of the one electrical connector 100 are insertable into the respective insertion slots of the other electrical connector 100' to assembly the one electrical connector and the other electrical connector together. In this way, when the two circuit boards 3, 3' are electrically connected with each other, only one type of electrical connector is needed. The protruding bars and insertion slots of the two electrical connectors 100, 100' are engaged with each other, which reduces manufacturing cost of the electrical connector.

In an exemplary embodiment of the disclosure, referring to FIGS. 1 and 2, a projection width of each of the differential signal terminal pairs 222 in a third direction (a width direction) perpendicular to the first direction and the second direction is less than that of the first grounding terminal 211 in the third direction. In other words, the projection width of each of the differential signal terminal pairs 222 in the third direction is totally projected within a projection range of the first grounding terminal 211 in the third direction.

Figure 9:
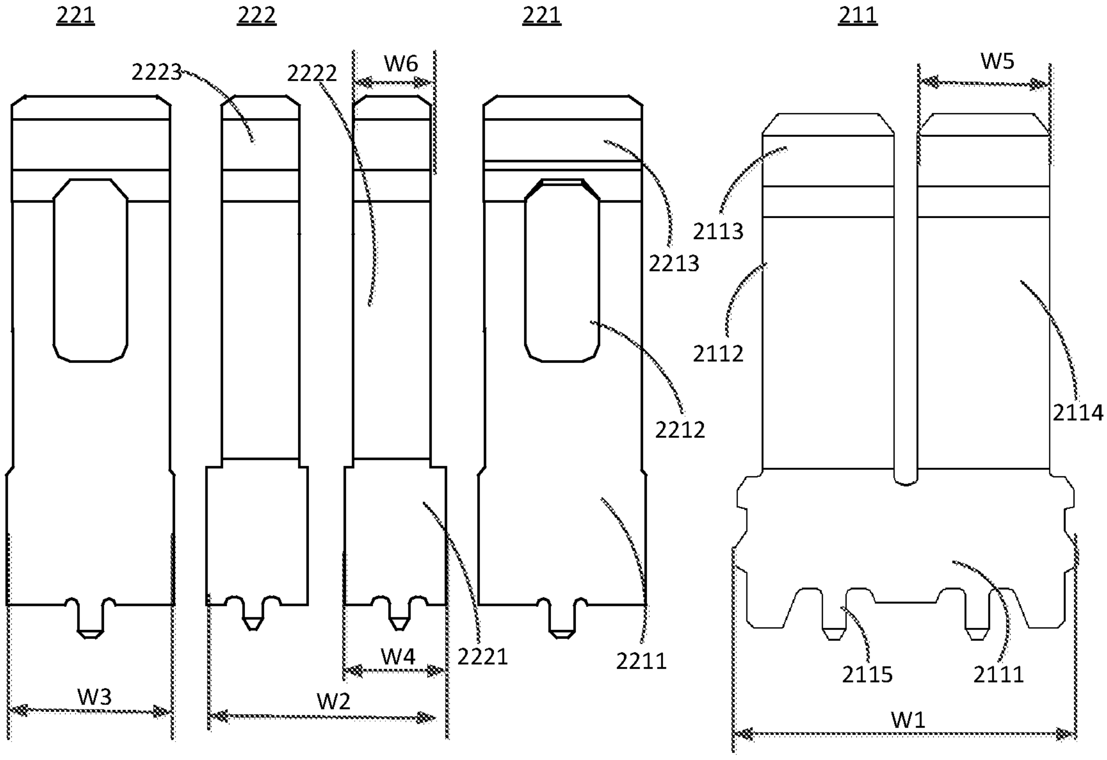
FIG. 9 shows a schematic plan view of three types of terminals of an electrical connector according to an exemplary embodiment of the disclosure.

FIG. 9 shows a schematic plan view of three types of terminals of an electrical connector according to an exemplary embodiment of the disclosure.

Figure 14:
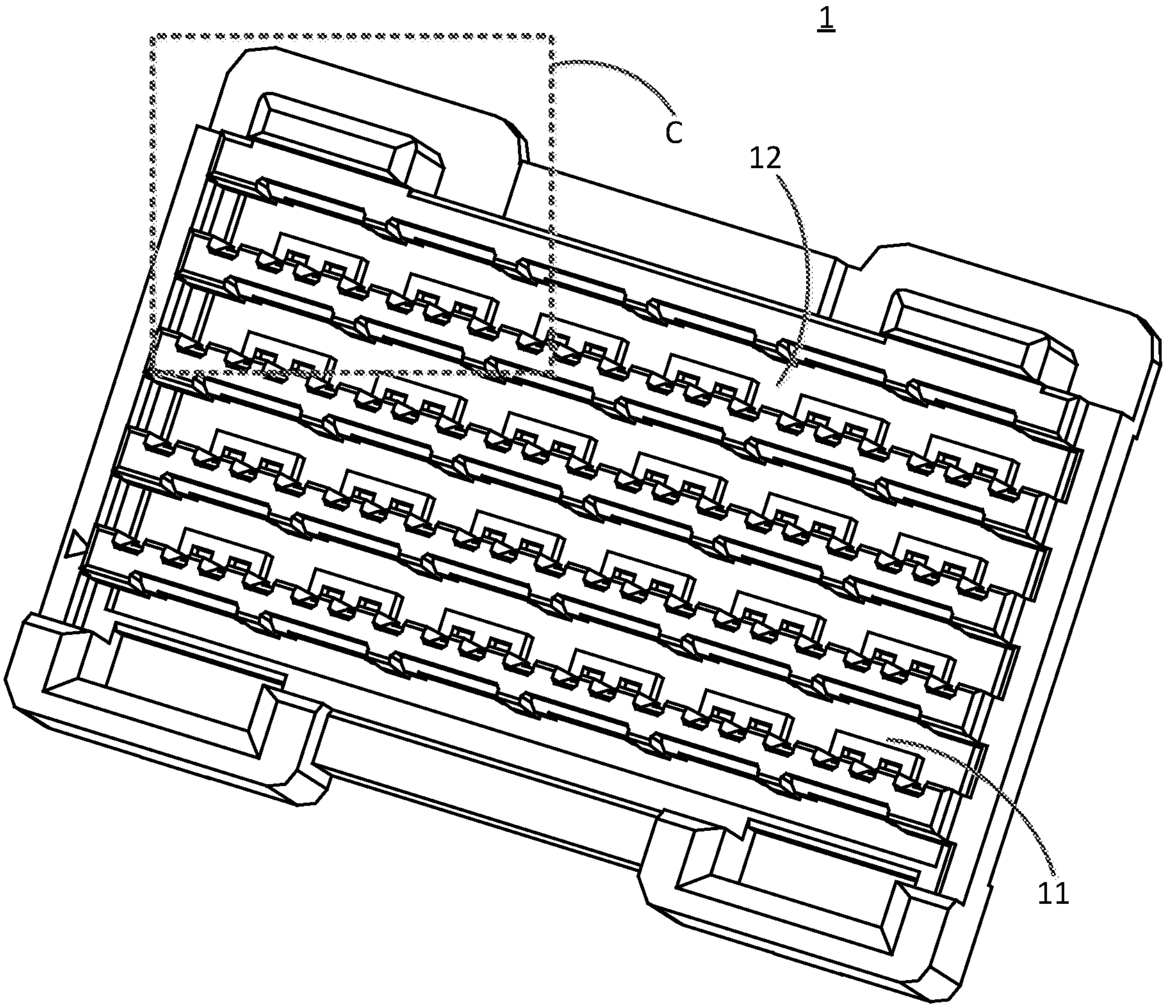
FIG. 14 shows a schematic perspective view of an insulation housing according to an exemplary embodiment of the disclosure.

In an exemplary embodiment of the disclosure, referring to FIGS. 9 and 14, the first grounding terminal 211 includes a first body portion 2111, and a first elastic portion 2112 extending from the first body portion 2111 and having a free end formed as an arc-shaped first contact portion 2113. The second grounding terminal 221 includes a second body portion 2211 and a second elastic portion 2212 extending from the second body portion 2211, and having a free end formed as an arc-shaped second contact portion 2213. The differential signal terminal includes a third main body portion 2221, and a third elastic portion 2222 extending from the third main body 2221 and having a free end formed as an arc-shaped third contact portion 2223. In addition, each of the first body portion 2111 of the first grounding terminal 211, the second body portion 2211 of the second grounding terminal 221 and the third body portion 2221 of the differential signal terminal is provided with a soldering portion 2115. After each terminal is mounted onto the insulation housing, solder balls 4 may be pre-arranged on the soldering portions 2115 to be soldered with electrical contacts of the circuit board.

According to the electrical connector as described in the above embodiments, when the one electrical connector 100 is connected with the other electrical connector 100', the contact portion of the terminal of the one connector 100 is brought into contact with the elastic portion of the terminal of the other electrical connector. At the same time, the contact portion of the other electrical connector 100' is brought in contact with the elastic portion of the one electrical connector 100. For example, when the one electrical connector 100 is connected with the other electrical connector 100', the first contact portion 2113 of the first grounding terminal 211 of the one connector 100 is brought into contact with the first elastic portion 2112' of first grounding terminal 211 of the other electrical connector 100'. At the same time, the first contact portion 2112' of the other electrical connector 100' is brought into contact with the first elastic portion 2112 of the one electrical connector 100. Therefore, two first grounding terminals 211 mated with each other of the two electrical connectors are brought into electrical contact with each other at four elastic first contact portions thereof, that is, two sets of the first contact portions mated with each other of the two first grounding terminals 211 form four electrical contact points totally. The differential signal terminals in contact with each other are brought into contact with each other at the third contact portion and form two contact points. In this way, the reliable electrical connection may be realized by the terminals of the two electrical connectors corresponding to each other.

In an exemplary embodiment of the disclosure, referring to FIG. 9, the first elastic portion 2113 includes two sub-elastic portions 2114 separated from each other to reduce an elastic force of the first elastic portion so as to facilitate an insertion of the two electrical connectors.

In an exemplary embodiment of the disclosure, referring to FIG. 9, the first body portion 2111 of the first grounding terminal 211 has a maximum width W1 greater than a total width W2 of the two third body portions 2221 of the differential signal terminal pair. The second body portion 2211 of the second grounding terminal 221 has a width W3 greater than a width W4 of one of the third body portions. The width W3 of the second body portion 2211 of the second grounding terminal 221 is less than the total width W2 of the two third body portions 2221 of the differential signal terminal pair. Each of the sub-elastic portions 2114 of the first grounding terminal 211 has a width greater than a width W6 of one of the third elastic portions.

Figure 10:
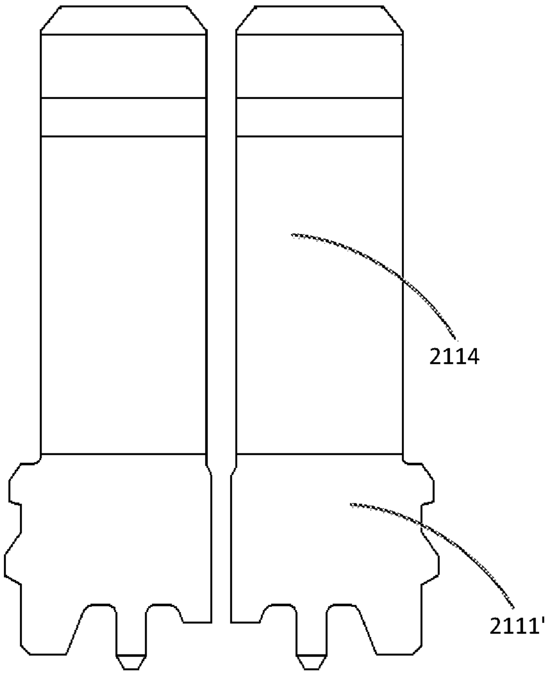
FIG. 10 shows a schematic plan view of a first grounding terminal according to another exemplary embodiment of the disclosure.

FIG. 10 shows a schematic plan view of a first grounding terminal according to another exemplary embodiment of the disclosure. A first body portion 2111 of the first grounding terminal 211 includes two sub-body portions 2111' separated from each other. In an exemplary embodiment of the disclosure, referring to FIGS. 1, 2, 4 and 5, the insulation housing 1 is provided with a guide groove 14 and a guide post 15, and the guide post 15 of the one electrical connector 100 may be inserted into the guide groove 14 of the another electrical connector 100'. When two electrical connectors are connected with each other, the two electrical connectors can only be plugged together when the guide post and guide slot of the two electrical connectors are aligned with each other. Otherwise, the two electrical connectors cannot be plugged into each other. Therefore, the guide post and the guide groove not only have a guiding function, but also can avoid incorrect connection of the two electrical connectors. In an exemplary embodiment of the disclosure, the guide groove 14 and/or the guide post 15 has a height equal to or greater than that of the protruding bar 12.

Figure 11:
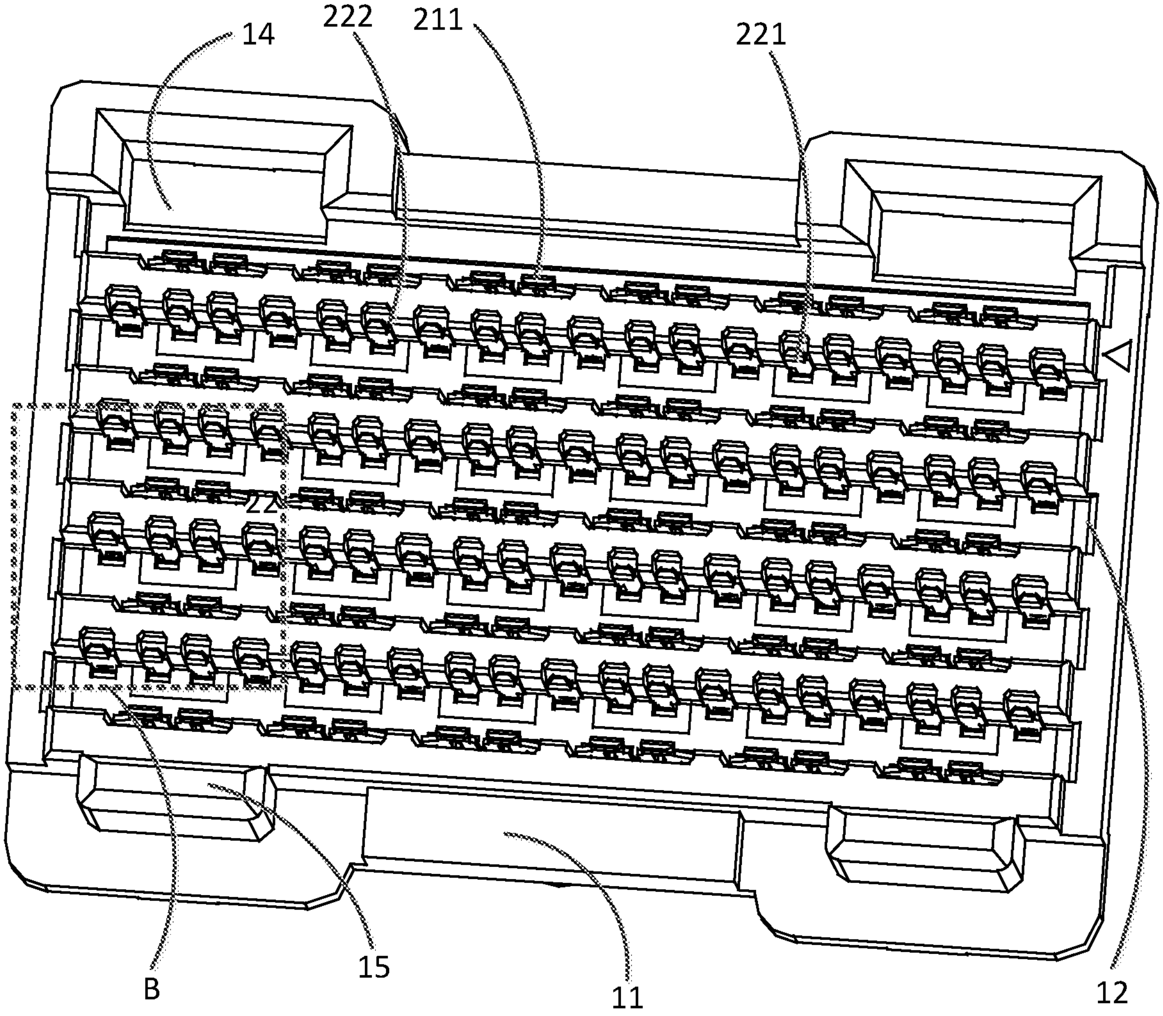
FIG. 11 shows a schematic perspective view of an electrical connector according to another exemplary embodiment of the disclosure.
Figure 12:
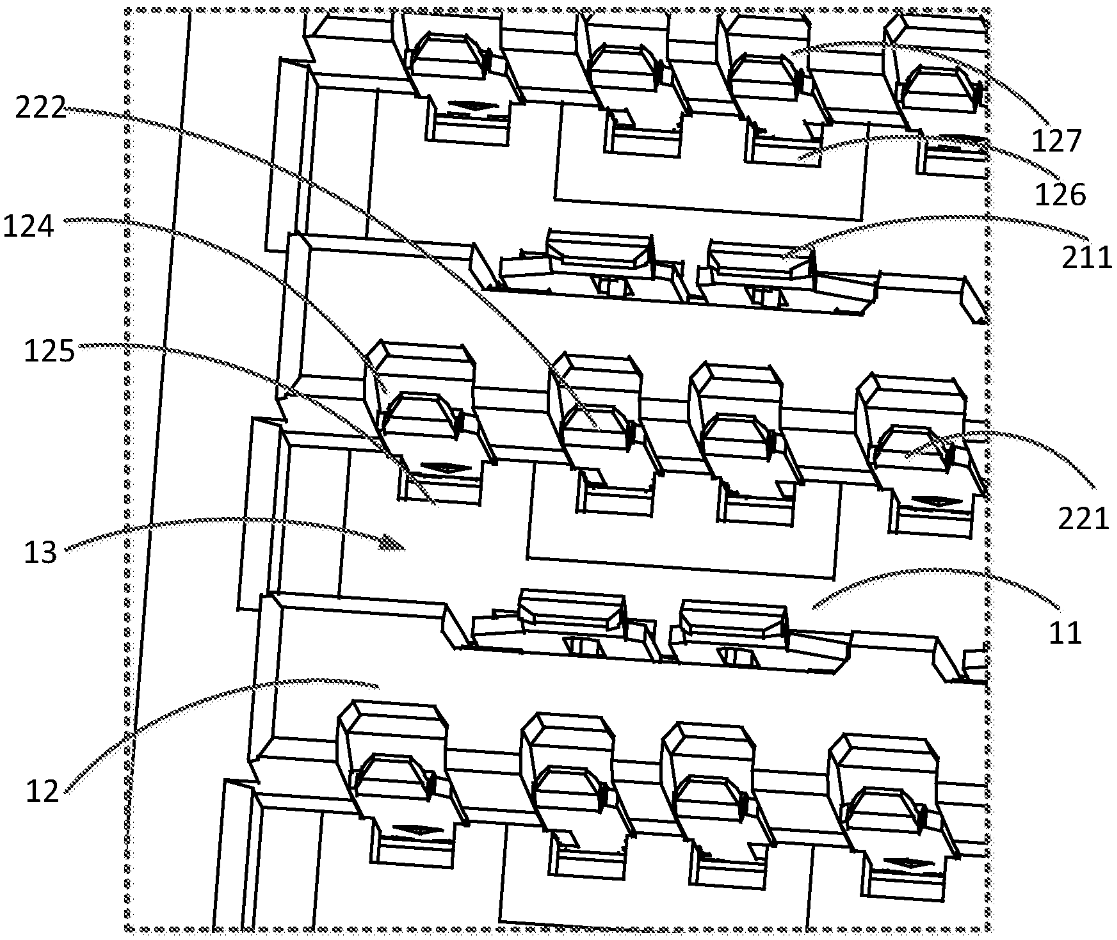
FIG. 12 shows a schematic enlarged view of a part 'B' shown in FIG. 11.
Figure 13:
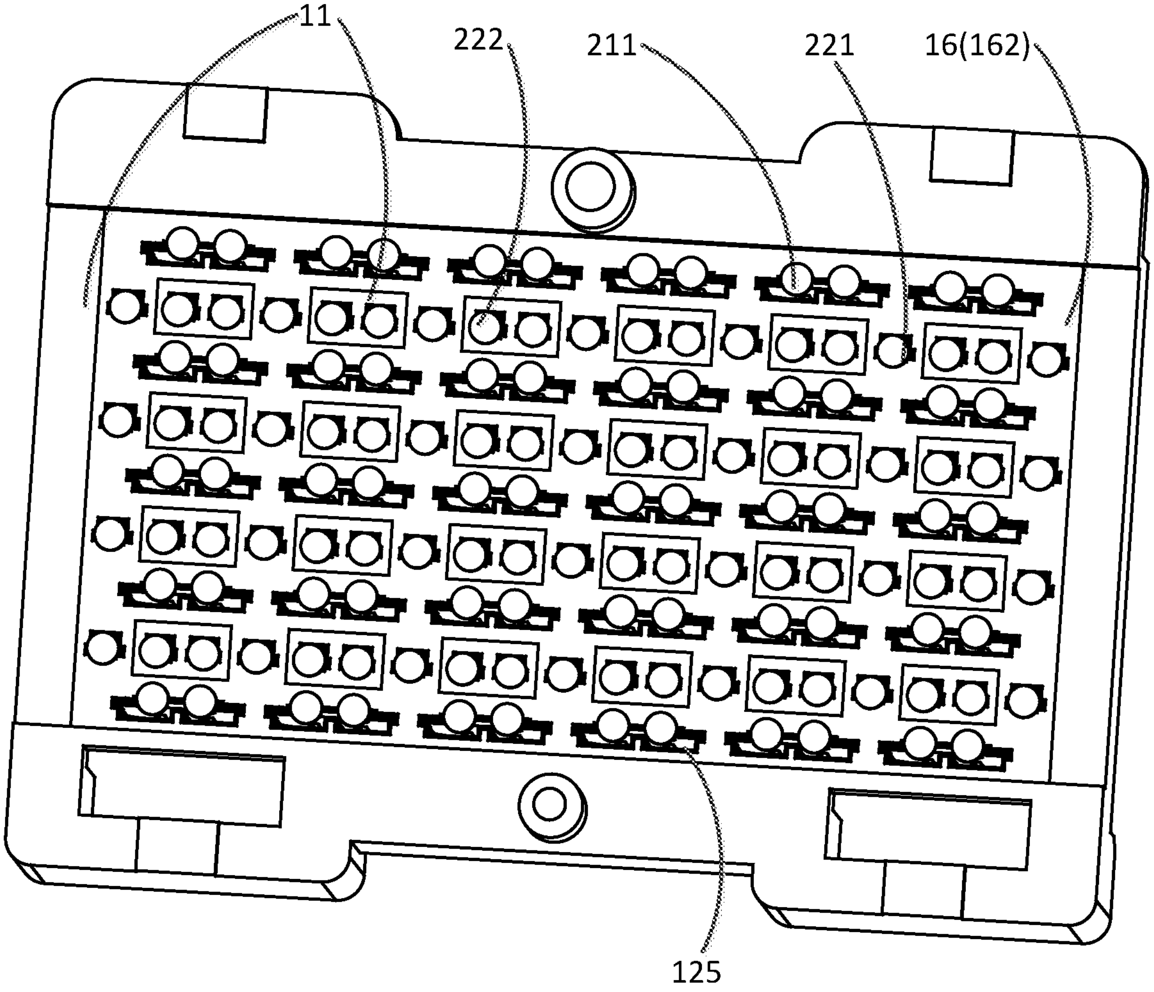
FIG. 13 shows another schematic perspective view of the electrical connector shown in FIG. 12.

FIG. 11 shows a schematic perspective view of an electrical connector according to another exemplary embodiment of the disclosure, FIG. 12 shows a schematic enlarged view of part B shown in FIG. 11, FIG. 13 shows another schematic perspective view of the electrical connector shown in FIG. 11, FIG. 14 shows a schematic perspective view of an insulation housing according to an exemplary embodiment of the disclosure, FIG. 15 shows a schematic enlarged view of part C shown in FIG. 14 and FIG. 16 shows a schematic perspective view of a metallization layer according to an exemplary embodiment of the disclosure in which the insulation housing is not shown for clarity.

In an exemplary embodiment of the disclosure, as shown in FIGS. 6, 11-16 and with reference to FIG. 3, the bottom wall 11 of the insulation housing 1 is formed with a plurality of first through holes 125 and a plurality of second through holes 126. The side walls of each of the protruding bars is formed with a plurality of first grooves 124 and a plurality of second grooves 127 in communication with the first through hole 125 and the second through hole 126, respectively. The first grounding terminals 211 and the second grounding terminals 221 are mounted in the first through holes 125 and the first grooves 124, respectively. The differential signal terminals of the differential signal terminal pairs 222 are mounted in the second through holes 126 and the second grooves 127, respectively. The body portions of the first grounding terminal 211, the second grounding terminal 221 and each terminal of the differential signal terminal pairs 222 are mounted in the first through holes 125 and the second through holes 126, respectively, and the elastic portion and the contact portion are at least partially received in the first grooves 124 and the second grooves 127. When the two electrical connectors 100,100' are electrically connected with each other, the elastic portion and the contact portion of each terminal may be further at least partially biased into the first groove 124 and the second groove 127. Thus, it is possible to facilitate a plugging operation of the two electrical connectors. An electrical connection layer 16 extends into the first through holes 125 to achieve a reliable electrical connection between the grounding terminals and the electrical connection layer.

In an exemplary embodiment of the disclosure, the insulation housing 1 is provided with an electrical connection layer through which at least two of the plurality of first grounding terminals 211 and the plurality of second grounding terminals 221 are electrically connected to each other. The electrical connection layer 16 is electrically insulated from the differential signal terminal pair 222. The electrical connection layer includes a metallization layer 161 applied on the insulation housing 1 and a conductive layer 162 covering the metallization layer.

The metallization layer includes a plastic layer having the conductive particles. For example, the conductive particles are palladium particles. The conductive layer comprises a nickel layer or a copper layer. The at least two grounding terminals including the first grounding terminal 211 and the second grounding terminal 221, and even all the grounding terminals, are connected with each other through the electrical connection layer. Thus, it is possible to reduce sensitivity of dimensional manufacturing tolerances of components, such as the grounding terminals or the through holes for holding the grounding terminals, to transmission high-frequency performance, while improving a resonance generated when transmitting high-frequency signals to make the signal transmission more stable. It should be understood that the insulation housing 1 is also provided with through holes or grooves adapted to hold the differential signal terminals, and there is no electrical connection layer provided on a surface of these through holes or grooves.

Further, the electrical connection layer 16 extends to a region of the bottom wall 11 expect for a region where the differential signal terminal pairs 22 are located. Since there is no plastic layer and conductive layer on the region where the differential signal terminals are located, i.e., the electrical connection layer 16 is provided with windows 1611 at positions where the differential signal terminal pairs 222 are located, so that the different differential signal terminals are electrically insulated from each other, and the differential signal terminals are also electrically insulated from the grounding terminals. In this way, each of the terminals can be electromagnetically shielded at the bottom of the electrical connector to further suppress the signal crosstalk.

In a process of manufacturing the electrical connector 100, referring to FIGS. 14 and 15, firstly, forming a insulation housing 1 of a Liquid Crystal Polymer (LCP), for example, through an injection molding process (first injection molding process); applying a plastic layer including conductive particles on the insulation housing 1 through a further injection molding process (second injection molding process); applying a conductive layer on the plastic layer to form an electrical connection layer 16; mounting a plurality of grounding terminals (including a first grounding terminal 211 and a second grounding terminal 221) on the insulation housing 1, respectively, so that at least two of the plurality of grounding terminals are electrically connected with each other through the electrical connection layer 16. Since the insulation housing 1 is made of plastic material, it is difficult to directly plate a surface of the insulation housing 1 with metal material. The plastic layer including the conductive particles is applied on the surface of the insulation housing 1 so that the plastic layer has certain properties of a metal layer. Therefore, a conductive layer 162 may be plated on the insulation housing 1 with the plastic layer to realize an electrical connection of the plurality of grounding terminals. The plastic layer including the conductive particles is applied on the insulation housing 1 through the further injection molding process (second injection molding process).

In an exemplary embodiment of the disclosure, the step of forming the insulation housing 1 through the injection molding process includes: forming second through holes 126 adapted to mount differential signal terminals on a bottom wall 11 of the insulation housing 1; forming first grooves 124 adapted to accommodate the grounding terminals (the first grounding terminal and the second grounding terminal) and second grooves 127 in communication with the second through holes 126 and adapted to accommodate the differential signal terminals on the protruding bars of the insulation housing 1.

In an exemplary embodiment of the disclosure, as shown in FIGS. 14 to 16, the step of applying the plastic layer 161 including conductive particles on the insulation housing 1 through the further injection molding process includes forming first through holes 125 in communication with the first grooves 124 and adapted to accommodates the grounding terminals so that the metallization layer is formed in the first through holes. That is to say, during forming the insulation housing 1 through the first injection molding process, only the second through holes 126 adapted to accommodate the differential signal terminals are formed in the bottom wall 11, and the first through holes 125 are not formed. The first through holes 125 adapted to mount the grounding terminals are formed during forming the plastic layer 161 through the second injection molding process. The first through holes 125 pass through the bottom wall 11 of the insulation housing 11 and are brought into communication with the first grooves 124.

In an exemplary embodiment of the disclosure, the conductive layer is plated on the plastic layer through a molded interconnect device (MID) molding process, or the conductive layer is deposited on the plastic layer through a physical vapor deposition (PVD) process.

In an exemplary embodiment of the disclosure, the bottom wall is provided with an isolation pad 3 for covering the electrical connection layer. After the grounding terminals and the differential signal terminals are installed on the insulation housing 1, the isolation pad 3 is mounted on a first side (an upper side of FIG. 4) of the bottom wall 11 of the electrical connector 100, and the soldering portion 2115 of each terminal passes through the isolation pad 3. Thereafter, the solder ball 4 made of solder material is formed on the soldering portion 2115 to prepare for electrical connection with an electrical contact of a circuit board.

According to another exemplary embodiment of the disclosure, referring to FIGS. 1-17, and particularly referring to FIGS. 1-3 and 9, there is provided an electrical connector 100 comprising: an insulation housing 1; a plurality of grounding terminal columns 21 arranged on the insulation housing and including a plurality of first grounding terminals 211; and a plurality of hybrid terminal columns 22 arranged on the insulation housing and including a plurality of second grounding terminals 221 and a plurality of differential signal terminals pairs 222. The plurality of grounding terminal columns and the plurality of hybrid terminal columns are arranged adjacent to each other, respectively. Each differential signal terminal pair 222 is located between two second grounding terminals 221 in one hybrid terminal column. Each of the first grounding terminals 211 has a width W1 greater than a width W3 of each of the second grounding terminals 211.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector, comprising:

an insulation housing including an electrical connection layer extending to a region of a bottom wall of the insulation housing, the bottom wall including an isolation pad covering the electrical connection layer;

a plurality of grounding terminal columns arranged on the insulation housing and comprising a plurality of first grounding terminals; and a plurality of hybrid terminal columns arranged on the insulation housing adjacent respective ones of the plurality of grounding terminal columns and including a plurality of second grounding terminals discrete from the first grounding terminals and a plurality of differential signal terminal pairs, each of the differential signal terminal pairs located between two adjacent second grounding terminals in one hybrid terminal column and is adjacent to two first grounding terminals of the grounding terminal columns adjacent to the one hybrid terminal column at both sides thereof, wherein at least two of the plurality of the first and second grounding terminals are electrically connected to each other through the electrical connection layer.

2. The electrical connector according to claim 1, wherein the insulation housing comprises:

a bottom wall, the grounding terminals and the differential signal terminal pairs extending from a first side to a second side of the bottom wall in a first direction; and a plurality of protruding bars protruding from the second side of the bottom wall and extending in a second direction perpendicular to the first direction, at least one of the grounding terminals or the differential signal terminals protruding from the second side of the bottom wall are held on a side wall of the protruding bars.

3. The electrical connector according to claim 2, wherein:

the plurality of protruding bars includes a first outer protruding bar, a second outer protruding bar and at least one middle protruding bar located between the first outer protruding bar and the second outer protruding bar;

the first outer protruding bar includes the grounding terminal column on an inner side thereof;

the second outer protruding bar includes the grounding terminal column and the hybrid terminal column on an inner side and an outer side thereof, respectively; and the at least one middle protruding bar includes the grounding terminal column and the hybrid terminal columns on both sides thereof, respectively.

4. The electrical connector according to claim 3, wherein an insertion slot is formed between two adjacent protruding bars, and the grounding terminal column and the hybrid terminal column are arranged on both sides of the insertion slot, respectively.

5. The electrical connector according to claim 4, wherein the insertion slot has a width slightly greater than that of the protruding bar, so that the protruding bar of one electrical connector is insertable into the insertion slot of another electrical connector to electrically connect the one electrical connector and the another electrical connector together.

6. The electrical connector according to claim 2, wherein a projection width of each of the differential signal terminal pairs in a third direction perpendicular to the first direction and the second direction is less than that of the first grounding terminal in the third direction.

7. The electrical connector according to claim 1, wherein:

the first grounding terminal comprises a first body portion, and a first elastic portion extending from the first body portion and having a free end formed as an arc-shaped first contact portion;

the second grounding terminal comprises a second body portion, and a second elastic portion extending from the second body portion and having a free end formed as an arc-shaped second contact portion; and a differential signal terminal of the differential signal terminal pair comprises a third main body portion, and a third elastic portion extending from the third main body and having a free end formed as an arc-shaped third contact portion.

8. The electrical connector according to claim 7, wherein at least one of:

the first body portion has a width greater than a total width of two third body portions of the differential signal terminal pair;

the second body portion has a width greater than that of one of the third body portions; or the width of the second body portion is less than the total width of the two third body portions of the differential signal terminal pair.

9. The electrical connector according to claim 1, wherein the insulation housing includes a guide groove and a guide post, and the guide post of one electrical connector is insertable into the guide groove of another electrical connector.

10. The electrical connector according to claim 9, wherein at least one of the guide groove or the guide post has a height equal to or greater than that of the protruding bar.

11. The electrical connector according to claim 1, wherein the electrical connection layer comprises a metallization layer applied on the insulation housing and a conductive layer covering the metallization layer.

12. The electrical connector according to claim 11, wherein the metallization layer comprises a plastic layer having conductive particles.

13. The electrical connector according to claim 1, wherein the electrical connection layer extends to the region of a bottom wall except for a region where the differential signal terminal pairs are located.

14. The electrical connector according to claim 1, wherein:

the insulation housing is formed with a plurality of through holes in the bottom wall thereof, and a protruding bar of the insulation housing includes a plurality of grooves in communication with the through holes in a side wall thereof, respectively; and the first grounding terminal, the second grounding terminal and each terminal of the differential signal terminal pairs are mounted in the through holes and the grooves, respectively.

15. The electrical connector according to claim 14, wherein the electrical connection layer extends to the through holes which are adapted to mount the first grounding terminal and the second grounding terminal.

16. A connector assembly, comprising:

a first electrical connector and a second electrical connector, each of the first and second electrical connectors including:

an insulation housing;

a plurality of grounding terminal columns arranged on the insulation housing and comprising a plurality of first grounding terminals; and a plurality of hybrid terminal columns arranged on the insulation housing adjacent respective ones of the plurality of grounding terminal columns and including a plurality of second grounding terminals and a plurality of differential signal terminal pairs, each of the differential signal terminal pairs located between two adjacent second grounding terminals in one hybrid terminal column and is adjacent to two first grounding terminals of the grounding terminal columns adjacent to the one hybrid terminal column at both sides thereof, the grounding terminals and the differential signal terminal pairs of the first and second electrical connectors are electrically connected with each other.

17. The connector assembly according to claim 16, wherein the bottom wall of each of the electrical connectors includes a circuit board electrically connected to the grounding terminals and the differential signal terminals on an outer side thereof to realize an electrical connection between the two circuit boards.

18. An electrical connector comprising an insulation housing, including:

a bottom wall; and a plurality of protruding bars including a first outer protruding bar, a second outer protruding bar and at least one middle protruding bar located between the first outer protruding bar and the second outer protruding bar;

a plurality of grounding terminal columns arranged on the insulation housing comprising a plurality of first grounding terminals; and a plurality of hybrid terminal columns arranged on the insulation housing adjacent respective ones of the plurality of grounding terminal columns and including a plurality of second grounding terminals and a plurality of differential signal terminal pairs, wherein:

each of the differential signal terminal pairs located between two adjacent second grounding terminals in one hybrid terminal column and is adjacent to two first grounding terminals of the grounding terminal columns adjacent to the one hybrid terminal column at both sides thereof;

the grounding terminals and the differential signal terminal pairs extend from a first side to a second side of the bottom wall in a first direction;

the plurality of protruding bars protruding from the second side of the bottom wall and extending in a second direction perpendicular to the first direction;

at least one of the grounding terminals or the differential signal terminals protruding from the second side of the bottom wall are held on a side wall of the protruding bars;

the first outer protruding bar includes the grounding terminal column on an inner side thereof;

the second outer protruding bar includes the grounding terminal column and the hybrid terminal column on an inner side and an outer side thereof, respectively; and the at least one middle protruding bar includes the grounding terminal column and the hybrid terminal columns on both sides thereof, respectively.

19. An electrical connector, comprising:

an insulation housing, including:

an electrical connection layer;

a plurality of through holes in a bottom wall thereof; and a protruding bar including a plurality of grooves in communication with the through holes in a side wall thereof;

a plurality of grounding terminal columns arranged on the insulation housing and comprising a plurality of first grounding terminals; and a plurality of hybrid terminal columns arranged on the insulation housing adjacent respective ones of the plurality of grounding terminal columns and including a plurality of second grounding terminals and a plurality of differential signal terminal pairs, each of the differential signal terminal pairs located between two adjacent second grounding terminals in one hybrid terminal column and is adjacent to two first grounding terminals of the grounding terminal columns adjacent to the one hybrid terminal column at both sides thereof, wherein:

at least two of the plurality of the first and second grounding terminals are electrically connected to each other through the electrical connection layer; and the first grounding terminal, the second grounding terminal and each terminal of the differential signal terminal pairs are mounted in the through holes and the grooves, respectively.

20. An electrical connector, comprising:

an insulation housing having an electrical connection layer, the electrical connection layer including a metallization layer applied on the insulation housing and a conductive layer covering the metallization layer, the metallization layer including a plastic layer having conductive particles;

a plurality of grounding terminal columns arranged on the insulation housing and comprising a plurality of first grounding terminals; and a plurality of hybrid terminal columns arranged on the insulation housing adjacent respective ones of the plurality of grounding terminal columns and including a plurality of second grounding terminals and a plurality of differential signal terminal pairs, each of the differential signal terminal pairs located between two adjacent second grounding terminals in one hybrid terminal column and is adjacent to two first grounding terminals of the grounding terminal columns adjacent to the one hybrid terminal column at both sides thereof, wherein at least two of the plurality of the first and second grounding terminals are electrically connected to each other through the electrical connection layer.

* * * * *